(12) United States Patent
Swartz et al.

(10) Patent No.: US 7,792,795 B1
(45) Date of Patent: Sep. 7, 2010

(54) CONTEXT SERVICE SYSTEM

(75) Inventors: Tanya Swartz, Seattle, WA (US); Srikanth R. Avadhanam, Redmond, WA (US); Gagan Chopra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 10/463,161

(22) Filed: Jun. 17, 2003

(51) Int. Cl.
*G06F 17/30* (2006.01)

(52) U.S. Cl. .................................................. 707/627

(58) Field of Classification Search ................. 707/627
See application file for complete search history.

(56) References Cited

U.S. PATENT DOCUMENTS

| | | | | |
|---|---|---|---|---|
| 5,033,009 A | * | 7/1991 | Dubnoff | 715/503 |
| 5,713,020 A | * | 1/1998 | Reiter et al. | 707/102 |
| 6,185,598 B1 | * | 2/2001 | Farber et al. | 709/200 |
| 6,347,340 B1 | * | 2/2002 | Coelho et al. | 709/246 |
| 6,510,350 B1 | * | 1/2003 | Steen et al. | 700/9 |
| 6,636,803 B1 | | 10/2003 | Hartz et al. | 701/208 |
| 6,708,186 B1 | * | 3/2004 | Claborn et al. | 707/102 |
| 6,842,737 B1 | * | 1/2005 | Stiles et al. | 705/6 |
| 6,847,393 B2 | * | 1/2005 | Ashe et al. | 348/61 |
| 6,847,892 B2 | * | 1/2005 | Zhou et al. | 701/213 |
| 6,934,532 B2 | * | 8/2005 | Coppinger et al. | 455/412.1 |
| 6,944,662 B2 | * | 9/2005 | Devine et al. | 709/225 |
| 6,947,571 B1 | * | 9/2005 | Rhoads et al. | 382/100 |
| 6,980,962 B1 | * | 12/2005 | Arganbright et al. | 705/26 |
| 7,240,027 B2 | * | 7/2007 | McConnell et al. | 705/28 |
| 7,299,067 B2 | * | 11/2007 | Riggs | 455/556.2 |
| 7,401,131 B2 | * | 7/2008 | Robertson et al. | 709/220 |
| 7,428,723 B2 | * | 9/2008 | Greene et al. | 717/103 |
| 2001/0037361 A1 | * | 11/2001 | Croy | 709/203 |
| 2002/0080771 A1 | * | 6/2002 | Krumel | 370/352 |
| 2002/0184170 A1 | * | 12/2002 | Gilbert et al. | 706/20 |
| 2004/0015783 A1 | * | 1/2004 | Lennon et al. | 715/523 |

OTHER PUBLICATIONS

RDF Site Summary (RSS) 1.0 Specification. Published Dec. 9, 2000. Available online at http://web.resource.org/rss/1.0/spec.*

"Why getter and setter methods are evil", Allen Holub. Available online at http://www.javaworld.com/javaworld/jw-09-2003/jw-0905-toolbox.html. Published Sep. 5, 2003. Accessed Jun. 9, 2006.*

"Core J2EE Patterns: Best Practices and Design Strategies" by Deepak Alur et al. Chapter 9, "Data Access Objects" Jun. 26, 2001.*

"Developer's Guide to Building XML-based Web Services with the Java 2 Platform, Enterprise Edition (J2EE)" by James Kao. Jun. 2001. Available online at: http://www.theserverside.com/tt/articles/pdf/J2EE-WebServices-DevGuide.pdf.*

(Continued)

*Primary Examiner*—Neveen Abel Jalil
*Assistant Examiner*—Mark Andrew X Radtke
(74) *Attorney, Agent, or Firm*—Christopher J. Volkmann; Westman, Champlin & Kelly, P.A.

(57) ABSTRACT

The present system aggregates information from a plurality of different context sources. The present system also makes that aggregated information available to requesting components by abstracting it into a generalized form. Thus, the developer of a context-aware application need only know how to interact with the context service of the present invention, rather than knowing how to interact with each and every one of the context sources.

23 Claims, 6 Drawing Sheets

OTHER PUBLICATIONS

"Web Services Made Easier" by Sun Microsystems, Jun. 2002. Available online at: http://java.sun.com/xml/webservices.pdf.*

"What is RSS" by Mark Pilgrim. Published Dec. 18, 2002. Accessed Nov. 10, 2007. Available online: http://www.xml.com/pub/a/2002/12/18/dive-into-xml.html.*

"RFC: MetaWeblog API" by Dave Winer. Published Mar. 14, 2002. Accessed Nov. 10, 2007. Available online: http://www.xmlrpc.com/metaWeblogApi.*

"The Evolution of RSS" by Andrew King. Published May 3, 2001. Accessed Nov. 10, 2007. Available online: http://www.webreference.com/authoring/languages/xml/rss/1/.*

* cited by examiner

CONTEXT SERVICE SYSTEM

BACKGROUND OF THE INVENTION

The present invention relates to context information. More specifically, the present invention relates to a system which aggregates and abstracts context information from a plurality of different sources and makes it available to requesting applications.

The mobile business space is a business environment in which employees, contractors or other users communicate with one another using mobile devices, such as cellular telephones, palmtop computers, laptop computers, personal digital assistances (PDAs) etc. In such a business environment, contextual information can be critically important in running a business in an efficient manner, and in a manner which is satisfactory to the customers of the business.

However, building business software and computing solutions to satisfy the needs of this business environment is challenging, expensive, and time consuming. The following scenario illustrates some of the challenges associated with this business environment. Assume that a television repair company conducts business by sending technicians to customer sites to fix problems with the customers' televisions. All customer calls are directed through a central call center. A dispatcher receives a call at the call center from a customer whose television has suddenly stopped displaying color. The customer insists that a technician make a call the same day in order to address the problem. In order to assign an appropriate technician to service the customer's call, the dispatcher would desirably know which technician is most qualified, which one has time in his or her schedule to service the customer's call today, which technician is the most affordable, given the previous constraints, and which technician is the closest to the customer. In other words, the dispatcher would desirably know the context associated with the technicians prior to assigning a technician to the customer's call.

However, all of this information currently comes from a wide variety of different sources, which are not easily accessed and obtained. In order to access this wide variety of different sources, a developer must have knowledge of each of the systems which provide different portions of the desired information, know how to interact with those systems, and know how to obtain the relevant information from those systems. This can be quite difficult since the context data sources can vary widely including, by way of example, user personnel files, calendaring or scheduling programs, geographic location devices, cellular networks, mobile devices, etc.

SUMMARY OF THE INVENTION

The present system aggregates information from a plurality of different context sources. The present system also makes that aggregated information available to requesting components by abstracting it into a generalized form. Thus, the developer of a context-aware application need only know how to interact with the context service of the present invention, rather than knowing how to interact with each and every one of the context sources.

In one embodiment, the present invention includes a context data store that stores context data aggregated from the plurality of sources. A context service interface is provided which exposes methods that can be called to add context data to the data store and retrieve context data from the data store.

In one embodiment, a find service is provided which receives a request to retrieve context data and invokes the methods on the context service interface to retrieve the desired data. A data provider service can also be provided to receive context data from the plurality of sources and invoke methods on the context service interface to add or update the context data in the data store based on the context data received.

Appendix A illustrates a number of classes in an exemplary class library.

DETAILED DESCRIPTION OF ILLUSTRATIVE EMBODIMENTS

The present invention deals with context information. More specifically, the present invention deals with a system for abstracting and aggregating context information from a variety of sources and making it available to requesting components. However, prior to discussing the present invention in greater deal, one embodiment of an illustrative computing environment for the present invention will be discussed.

Figure 1:
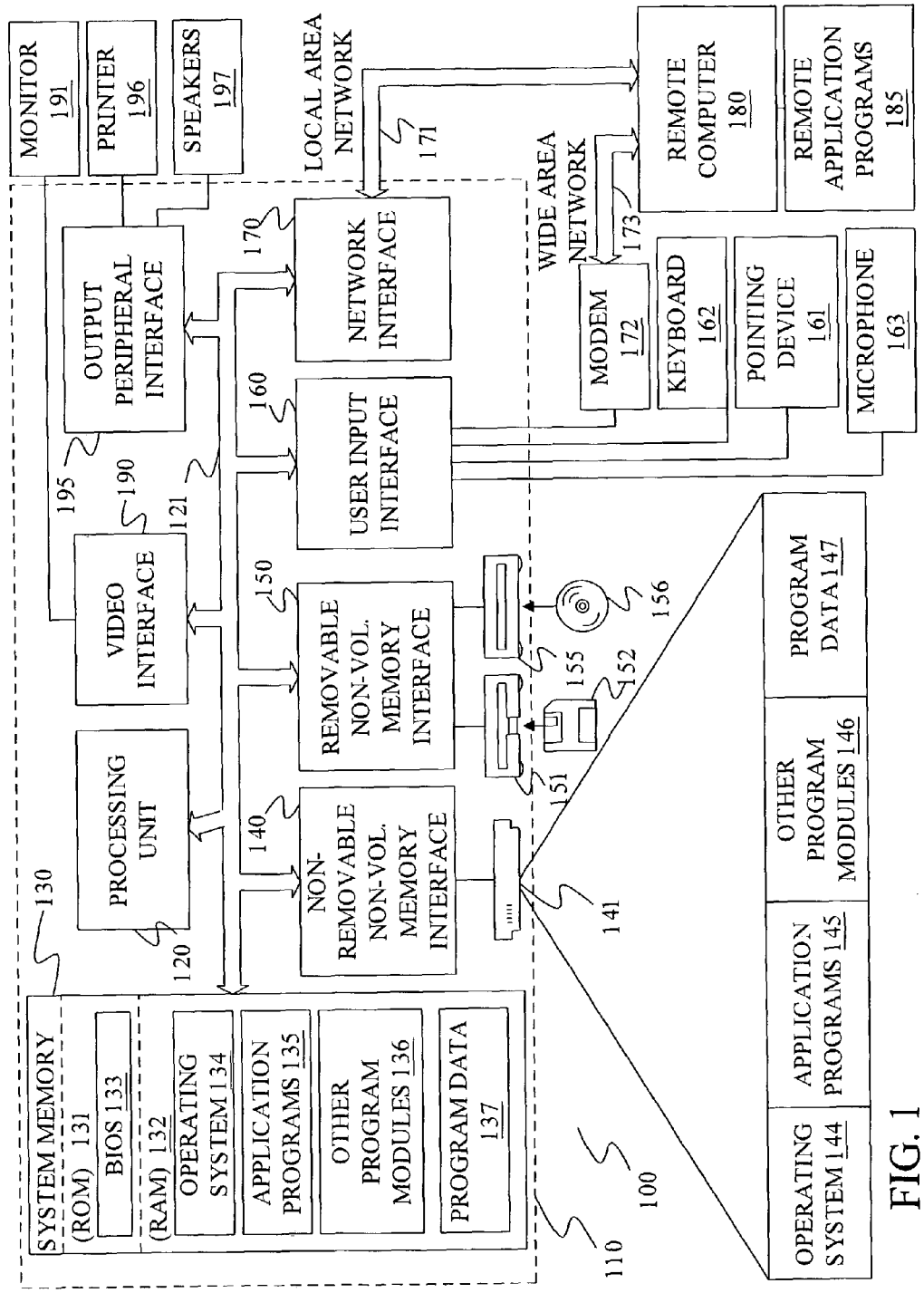
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

The discussion of the present invention refers to "context data" or "context information". For purposes of the present discussion, these terms mean any or all of the following information or similar information:

information that identifies a person (such as user name, user id, address, company, etc. . . . ), business attributes of the person (such as title, billing rate, level of training, expertise, teams the person belongs to, identifying information for those teams, etc. . . . ), the ways to contact the person (such as cellular telephone number#, e-mail address, telephone number, pager number, etc. . . . ), the person's preferences (such as desired hours of availability, preferred devices to use during various hours of the day, etc. . . . ), the devices used by the person and how those devices are set up (such as device id, device description, applications installed on the device, operating system on the device, memory available, etc. . . . ), the person's schedule and contact list, etc. . . . .

Figure 2:
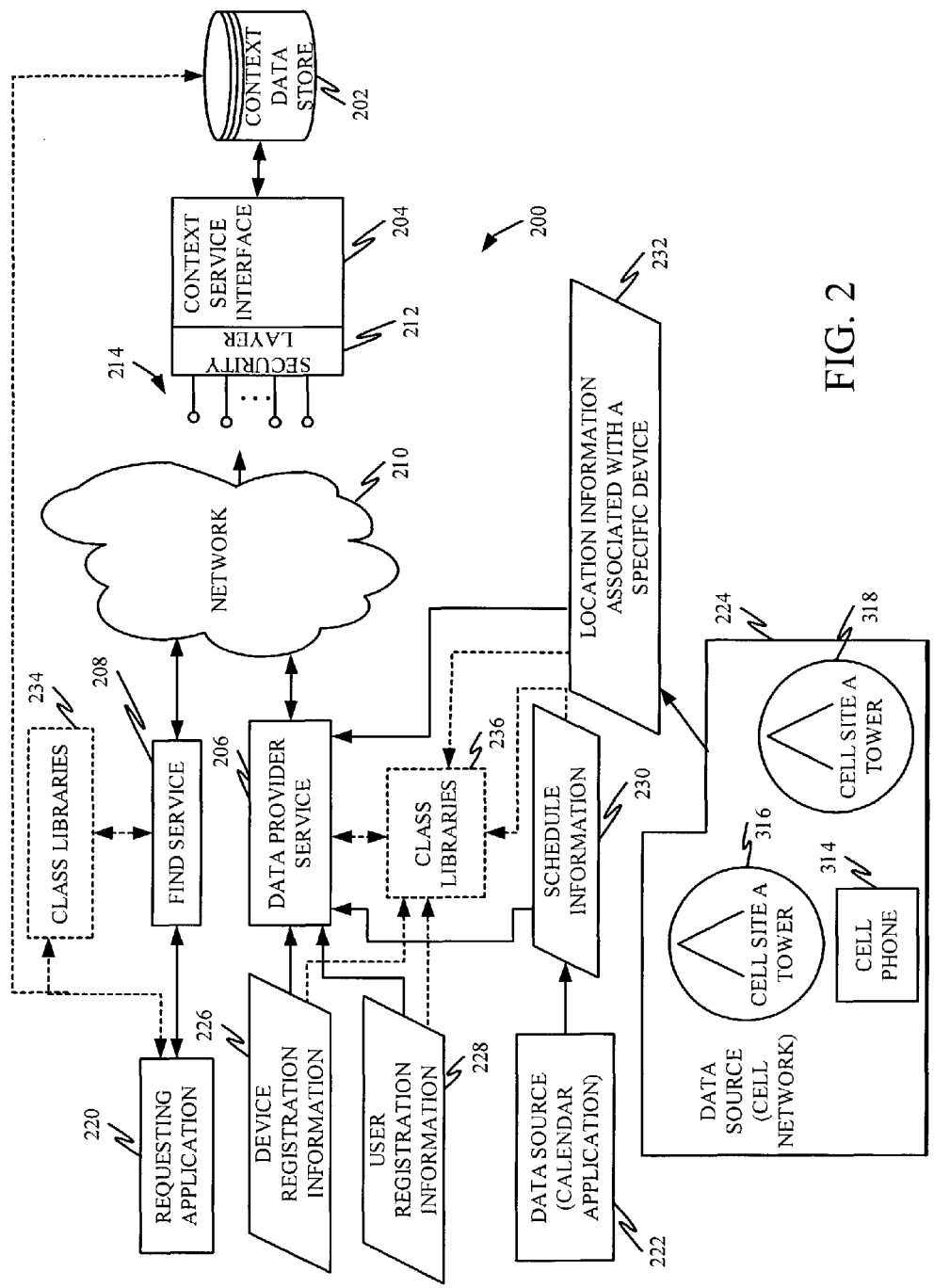
FIG. 2 is a block diagram of a context service system in accordance with one embodiment of the present invention.

FIG. 2 illustrates a block diagram of one embodiment of a context system 200. In the embodiment illustrated in FIG. 2, system 200 includes context data store 202, context service interface 204, data provider service 206 and find service 208.

FIG. 2 illustrates that interface 204 and services 206 and 208 are connected through a network 210, such as a local or wide area network. FIG. 2 also shows that context service interface 204 includes a security layer 212 (discussed in greater detail below) and that context service interface 204 (which can be implemented as objects in one or more class libraries) exposes a plurality of interfaces 214 that have methods which can be invoked by data provider service 206 and find service 208 through network 210.

In addition, FIG. 2 shows that context service system 200 is connected to a requesting application 220 which, in the embodiment illustrated, requests context information from data store 202. FIG. 2 also shows system 200 connected to a plurality of different data sources 222 and 224. The two data sources 222 and 224 which are illustrated are a calendar or scheduling application and a cellular network. Of course, it will be appreciated that a wide variety of other data sources can be connected to system 200 as well, such as a global positioning system (GPS) location system, application metadata system, a provisioning system, etc. FIG. 2 also illustrates that system 200 is configured to receive device registration information 226, user registration information 228, schedule information 230, and location information 232. Further, FIG. 2 illustrates optional class libraries 234 and 236 which can be instantiated, as described below.

System 200 aggregates context information from sources 222-224, as well as from devices and users and abstracts that information into a generalized form which is stored in context data store 202. In one embodiment interface 204 aggregates the information through data provider service 206. A requesting application 220, which will illustratively be a context-aware application that makes use of such context information, can request the aggregated and abstracted context information. In one embodiment, requesting application 220 requests the context information in context data store through find service 208.

Figure 3:
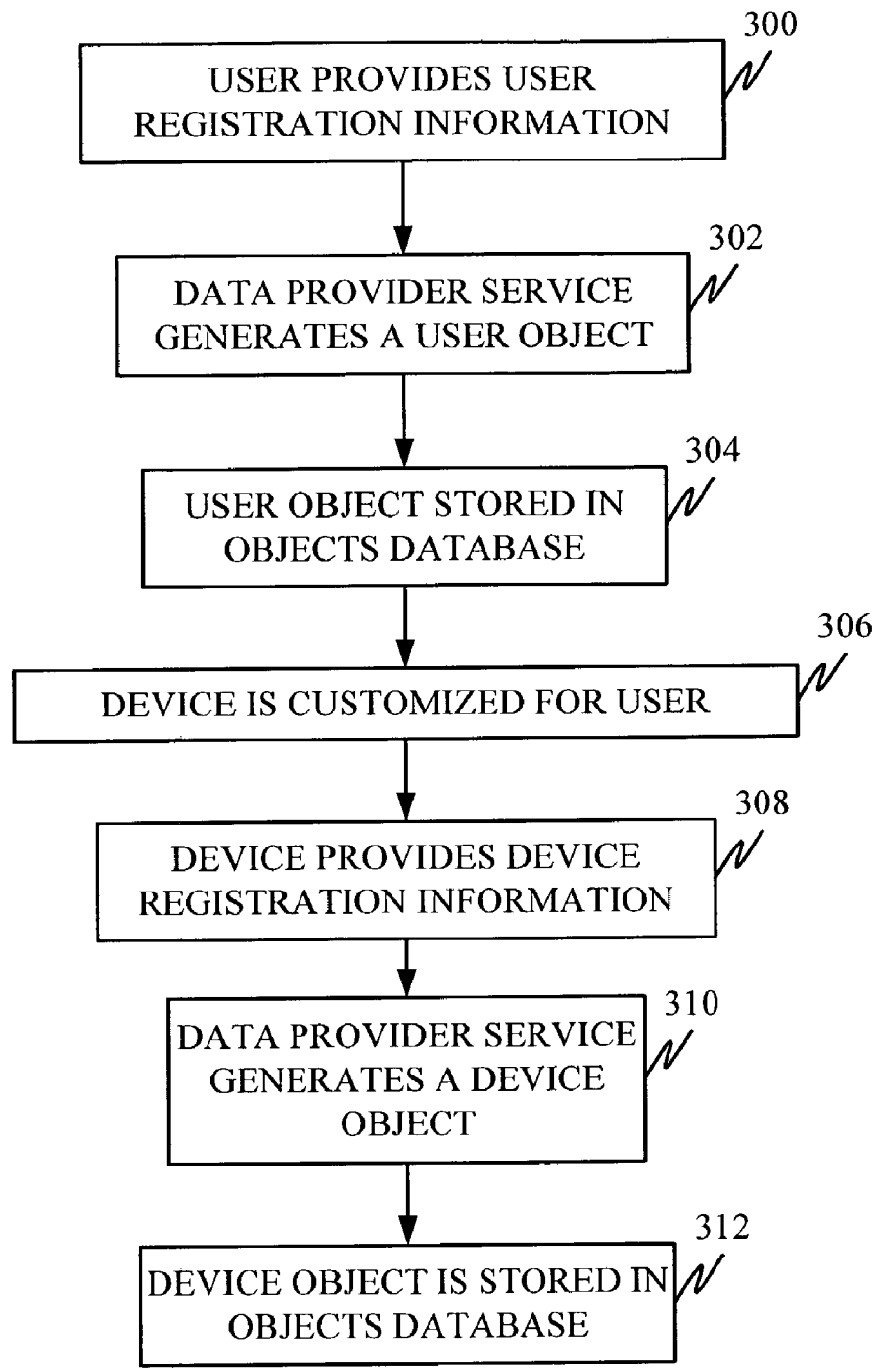
FIG. 3 is a flow diagram illustrating how context data is added to a context data store, in accordance with one embodiment.

FIG. 3 is a flow diagram which illustrates one embodiment for adding context data to data store 202. In the embodiment illustrated by FIG. 3, context data store 202 is illustratively a database that stores information represented by objects. The objects are accessed through context service interface 204. Thus, data store 202 can be a data store which stores information in terms of objects, or a relational database in which queries to the database are converted from an object referenced query to a relational database query by interface 204. In any case, interface 204 is configured to execute queries against data store 202 to obtain the information therein.

FIG. 3 illustrates how a user who wishes to obtain a mobile device registers with system 200, and how the device is registered with system 200 as well. First, the user provides user registration information 228 to data provider service 206. This is illustrated by block 300 in FIG. 3. In one embodiment, the user simply contacts an administrator of system 200 and provides an amount of user identification information sufficient to create a user object. The user object can include a user ID, which is a global unique identifier that uniquely identifies a user in the system, and may be assigned by the system or an administrator in the system. The user object can also include a user name which is a unique user name within the domain of the user and may also be chosen by the user, or assigned by the administrator or the system. The user object also illustratively includes the user's first name, the user's last name, the user's email address, the user's domain name (such as the company name), if applicable, and an indication as to whether the user is mobile enabled.

The indication as to whether the user is mobile enabled indicates whether the user is a mobile user in the company. For example, this field may be set to true if a user is allowed to submit mobile sales orders. Otherwise the field is set to false. Of course, the User object can include other information or different information. For instance, the user can provide user preferences, such as the times of day that the user wishes to be contacted on different devices that are registered under the user's name. By way of example, the user may wish to be contacted by cellular telephone during the morning hours and by electronic mail on the user's laptop in the afternoon hours.

Once this user registration information is received, it is provided to data provider service 206. Data provider service 206 generates a User object in a standard format. In one embodiment, the user registration information 228 is provided to data provider service 206 as a standard document (such as an XML document). Data provider service 206 then arranges the data into the standard User object form. Generating the User object is illustrated by block 302 in FIG. 3. Data provider service 206 then invokes one of methods 214 on interface 204, through network 210, in order to employ interface 204 to store the newly created User object in context data store 202. This is indicated by block 304 in FIG. 3.

Once the User object has been created and stored, the device which the user wishes to use is then customized for the user. This is illustrated by block 306 in FIG. 3. In one illustrative embodiment, the system administrator or provisioning department of the company that has deployed system 200 simply obtains the device requested by the user and then accesses the User object to customize the device for the user. For example, if the device which has been requested is a cellular telephone, customizing the device may include programming the cellular telephone with the user ID and user name.

Once the device has been customized for the user, the device provides device registration information 226 to data provider 206. This is indicated by block 308 in FIG. 3. The device registration information can include, for example, a device name which may be a user-friendly name for the device, a device ID which is a unique value and may be generated by system 200, a user ID which is the identifier for the owner or user of the device, a device type (such as cellular telephone, laptop, palmtop, etc.), an identification of the processor on the device, an identification of the screen size of the device (such as horizontal and vertical screen dimensions), an identification of the manufacturer of the device, and an indicator of the radio capabilities of the device (such as whether the device includes capabilities for GPS, GPRS, CDMA, 802.11, etc.). The device registration 226 information can also include an indication of the particular operating system running on the device, the version of the operating system running on the device, the physical address of the mobile device (which may be an IP address or for a cellular phone, its telephone number), the amount of random access memory on the device, etc.

Once data provider service 206 receives device registration information 226, it forms a Device object which represents the device registration information 226. This is indicated by block 310 in FIG. 3. Data provider service 206 then invokes a method 214 on interface 204 through network 210, in order to store the Device object in context data store 202. This is indicated by block 312 in FIG. 3.

Data provider service 206 can also receive information from a variety of other sources. For instance, FIG. 2 illustrates that data provider service 206 receives schedule information 230 from data source 222 which is a calendar application. In that example, once a user has been registered in system 200 by receipt of user registration information 228, associated calendar or schedule information 230 can be provided for that user. Schedule information 230 can include, for example, the normal working hours of the identified user, appointments scheduled for the identified user, as well as vacations or other times that a user may be unavailable. As with the user and device registration information, data provider service 206 forms a Schedule object and invokes methods 214 on interface 204 to store data represented by that object in context data store 202.

Another example of a data source which provides context information to system 200, and which is illustrated in FIG. 2, is a cellular network 224. Cellular network 224 includes a cellular telephone 314, a tower 316 for a first cell site (cell site A) and a tower 318 for a second cell site (cell site B). Cellular network 224 is already implemented with location capability that provides location information indicative of a generalized location of cellular telephone 314 (such as which cell site it is currently located in). In one embodiment, once cellular telephone 314 has registered by providing device registration information 226, cellular network 224 is queried to obtain location information 232 that is associated with the specific cellular telephone 314 that has registered with system 200. The location information may illustratively include a device ID which identifies the cellular telephone 314 (or other device) for which the location is being tracked, the country that the device is located in, the state that the device is located in, the city that the device is located in, and the XY coordinates (in terms of longitude and latitude) where the device is located. Data provider, service 206 again generates a Location object representing the location information and invokes methods 214 to store information represented by the Location object in context data store 202.

While a number of context data sources are illustrated in FIG. 2, it will be appreciated that any number of additional or different data sources can be provided as well. For example, if the device which has been registered includes a GPS receiver, then GPS location can be provided instead of location information 232 from cellular network 224. In addition, the device can provide information relating to the cellular carrier it uses as well as the roaming charges which are charged by that carrier. In addition, applications which reside on the device that has been registered can provide application metadata which includes the name and version of the application, the size of the application, etc.

In addition, a company may provide context information related to the organization of the company. For instance, a Team object may be included which identifies teams, a leader of each team and the name of each team. Similarly, team members may be identified by an object which correlates a team identifier with a user identifier. Many other sources of context data can be provided as well.

It should also be noted that information can be provided from the data sources to interface 204 in a variety of different ways. For instance, where data provider service 206 is implemented as a web service, the data source simply needs to provide a web address for contact service interface 204 along with the location of an XML document which contains the context information being submitted by the data source. In that embodiment, data provider service 206 retrieves the XML document and invokes the proper interface 214 to have context service interface 204 store information represented by an object generated based on the XML document in context data store 202.

In another embodiment, however, the methods of interacting with context data store 202 are implemented in class libraries. The data sources, if they have access to the class libraries, can instantiate objects from the class libraries and call the methods on the instantiated objects themselves. As illustrated in FIG. 2, class libraries 236 can be accessed by the data sources and objects in those classes can be instantiated and used to provide data to context data store 202.

Figure 4:
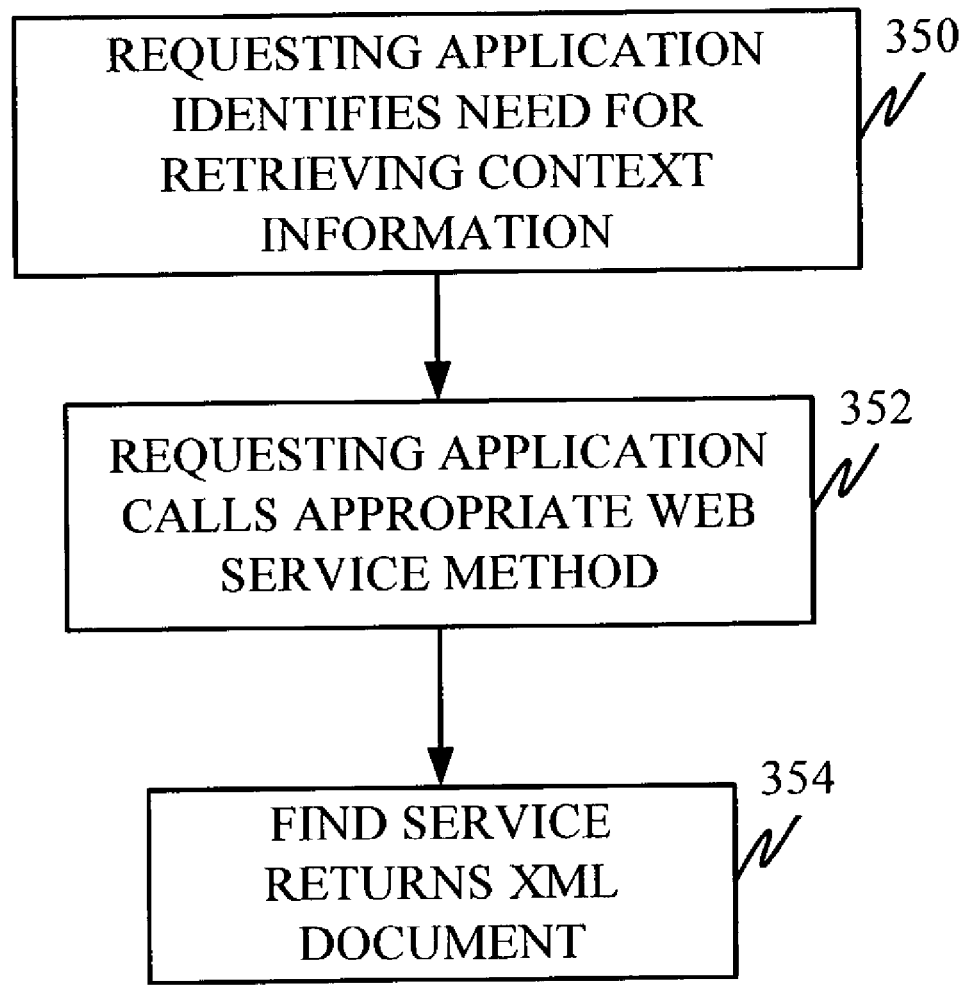
FIG. 4 is a flow diagram illustrating one embodiment of how information is retrieved from the context data store.

Not only can data be provided to context data store 202 by data sources, but it can be retrieved from context data store 202 by a requesting application 220. FIG. 4 is a flow diagram illustrating one embodiment in which requesting application 220 requests data from context data store 202. First, the requesting application 220 identifies a need for retrieving context information. In such an embodiment, requesting application 220 can illustratively be a context-aware application which makes decisions and generates messages and other outputs based on context. Thus, requesting application 220 has identified a need for a certain item of context information. This is indicated by block 350 in FIG. 4.

Requesting application 220 then invokes find service 208 by calling the appropriate web service method. Again, requesting application 220 simply provides the web address of context service interface 204, along with a location in which requesting application 220 desires to receive the XML document containing the context information requested. In that embodiment, find service 208 returns the XML document containing the requested context information to the specified location for access by requesting application 220. Calling the web service method is indicated by block 352 in FIG. 4 and the find service returning the XML document with the desired context information is indicated by block 354 in FIG. 4.

Figure 5:
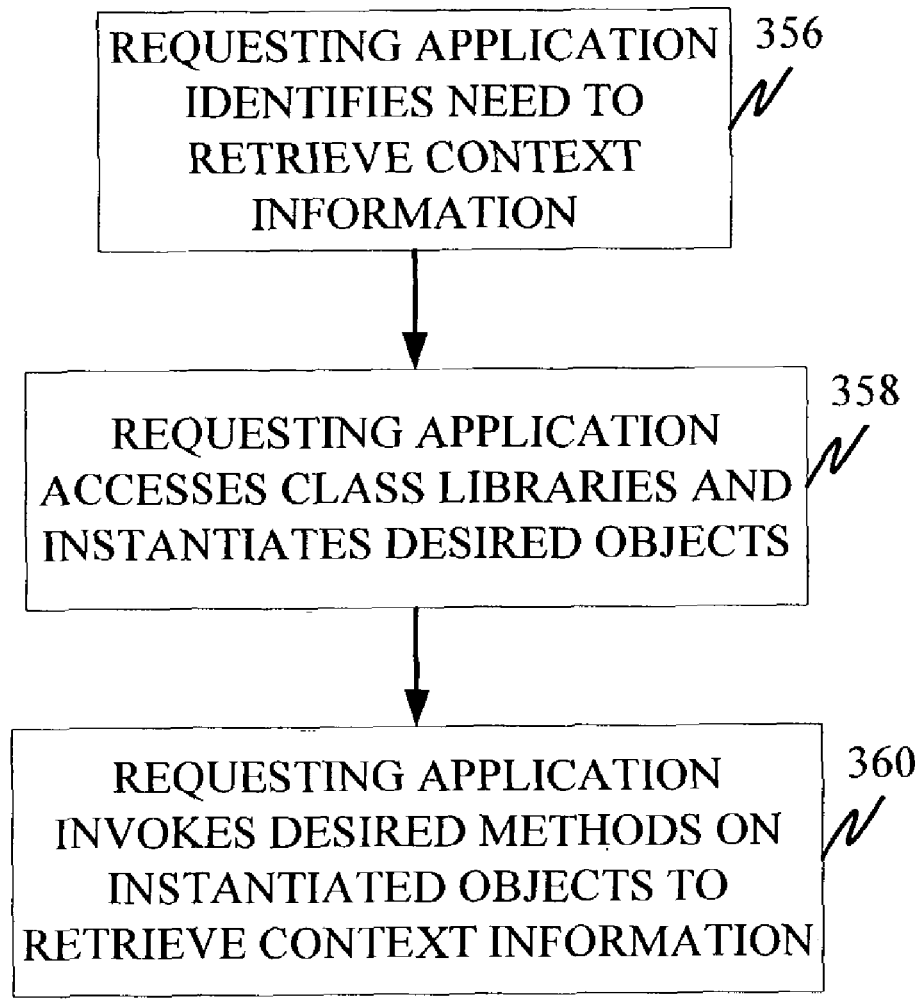
FIG. 5 is a flow diagram illustrating another embodiment of how context data is retrieved from the data store.

Of course, as with providing data to context data store 202, requesting applications 202 can (if they have access to class libraries 234) simply instantiate objects which implement the context service interface 204 and directly invoke the methods on those objects. This is indicated in greater detail in the flow diagram of FIG. 5. First, requesting application 220 identifies a need to retrieve context information. This is indicated by block 356 in FIG. 5. Requesting application 220 then accesses class libraries 234 and instantiates desired objects. This is indicated by block 358. Finally, requesting application 220 invokes desired methods on the instantiated objects to retrieve desired context information from context data store 202. This is indicated by block 360.

In accordance with yet another embodiment, it should be noted that requesting application 220 can access data in context data store 202 directly using database queries. For example, if data store 202 is implemented as a structured query language (SQL) database, then, so long as requesting application 220 is provided with access to data store 202, it can directly retrieve context information from data store 202 using SQL queries. Similarly, if the data sources are given direct access to data store 202, they can add information to data store 202 directly using SQL queries.

The class libraries discussed herein and used to implement interface 204 can take a wide variety of different forms. One illustrative embodiment of a number of the classes in an exemplary class library are set out in appendix A hereto. However, it should be noted that the classes discussed therein are exemplary only and any number of additional or different classes can be used as well.

Illustratively, all accesses to the context information through interface 204 are subjected to a security policy implemented by security layer 212. In one embodiment, security layer 212 is a rules-based security layer. Security layer 212 thus enforces access restriction and any other security measures implemented in the rules. Therefore, users are only allowed to access context information for which they are authorized by layer 212. The rules can implement security in various levels. For example, some users may be provided with complete access to all context information. Other users may be provided with no access to context information. Still other users may be provided with read only access, or read only access to some of the context information and read/write access to other context information. Of course, other or different security measures can be implemented as well.

Figure 6:
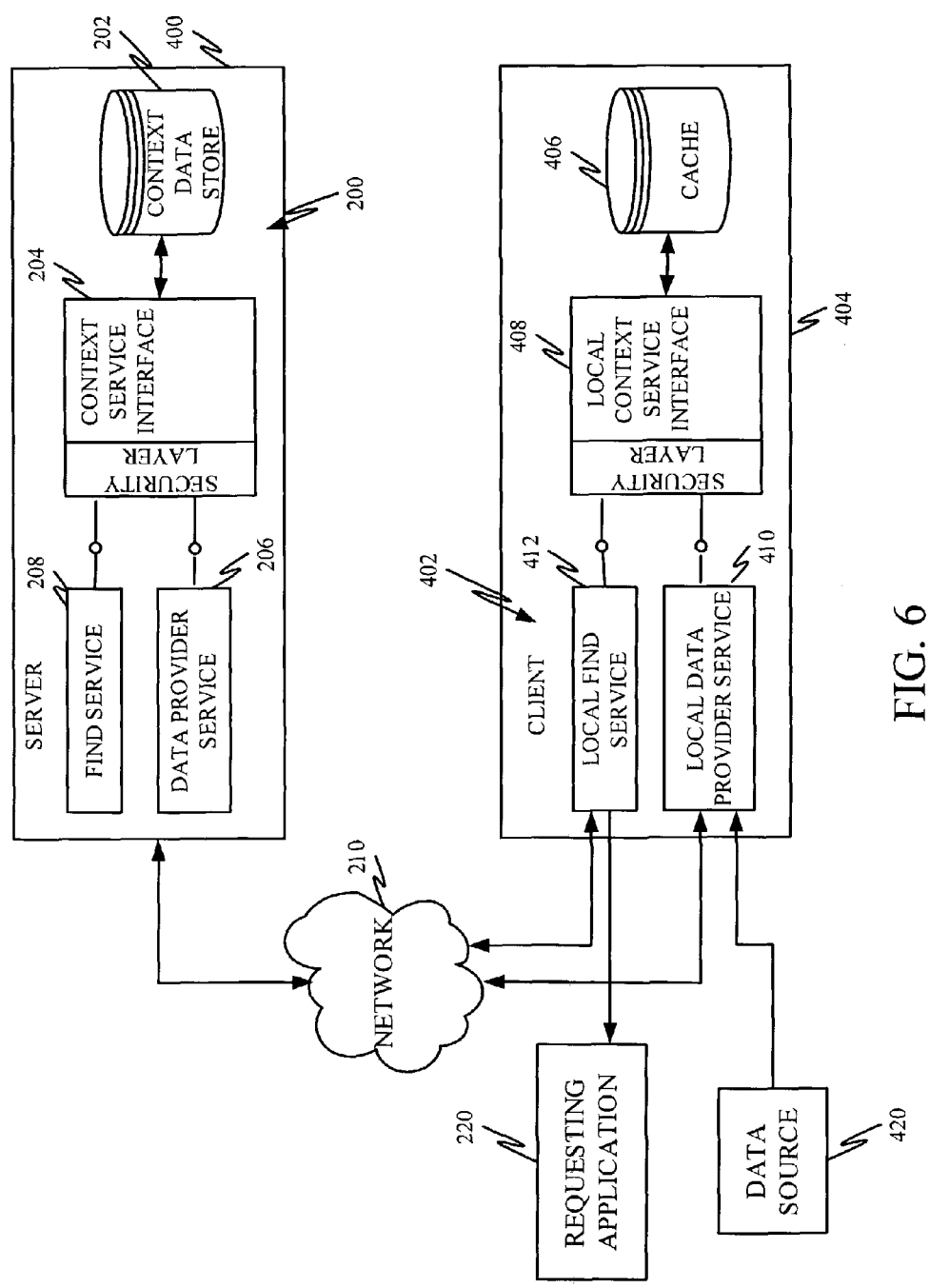
FIG. 6 is a block diagram of the context service system in a client/server environment.

FIG. 6 is a block diagram of another embodiment of the present invention in which the context service system is implemented in a client/server environment. FIG. 6 illustrates system 200 discussed with respect to FIG. 2 on a server 400. FIG. 6 also includes a local system 402, which includes the same components as system 200 except that they are located on client 404. Thus, system 402 includes local cache 406, local context service interface 408, local data provider service 410 and local find service 412. FIG. 6 also shows requesting application 220, network 210, and data sources which are collectively designated by numeral 420.

A number of operations will now be described in order to better illustrate the operation of the system shown in FIG. 6. In one illustrative operation, requesting application 220 requests local find service 412 to retrieve and return desired context information. In this embodiment, the desired context information is stored in cache 406. Therefore, local find service 412 invokes the appropriate method on interface 408 and retrieves the desired context information and returns it to requesting application 220.

In another operation, the information is not located in cache 406. In that embodiment, requesting application 220 provides local find service 412 with a request to retrieve the desired context information. Local find service 412 invokes the method on interface 408 to retrieve the desired information, and a null value (or other value) indicating that the information does not exist in cache 406 is returned. In that case, local find service 412 accesses find service 208 in system 200 through network 210. Find service 208 invokes the appropriate method on interface 204 to retrieve the data from data store 202. The data is retrieved and provided from find service 208 back to local find service 412 which returns it to requesting application 220. Local find service 412 then invokes an appropriate method on interface 408 to add the requested context information to cache 406.

In order to add context information, data source 420 first provides the context information to local data provider service 410. Local data provider service 410 then provides the information through network 210 to data provider service 206 in system 200. Data provider service 206, in turn, invokes an appropriate method on interface 204 to add the context information to context data store 202. This is confirmed back to local data provider service 410. Local data provider service 410 then invokes an appropriate method on interface 408 to add the context information to cache 406 and this is also confirmed to local data provider service 410.

It can thus be seen that the present invention helps to reduce information overload to developers and applications by filtering the information according to what is relevant in a current context. It does this by allowing a developer to write applications that are context aware and therefore reduce context information requested to that which is necessary. Similarly, the present invention provides a single place for obtaining all information related to context. The invention functions as an aggregator and abstractor for different providers of context information. Thus, it offers a simple object-oriented programming model to access contextual information so that the developer only needs to learn a single set of semantics instead of one corresponding to each source of context information. By implementing a security layer, the present invention enables custom authorization schemes to address privacy concerns. Similarly, by providing developers with access to the data store directly through SQL queries, developers can customize the service to their needs and performance requirements.

Using the present system, the scenario discussed in the background section can be greatly enhanced. For example, assume that the dispatcher receives a call from a customer that the television is broken (such as fails to display color) and that the customer wishes a technician to attend to the problem today. The dispatcher can simply select an "assign technician" function on a context aware application. This results in a technician being assigned to the job based on several factors considered by the function, such as, current location of the technician, the level of expertise of the technician, and the technician's schedule for the day. All of this information is obtained from the context service component and incorporated into the function of the context-aware application. The dispatcher then assigns the identified technician to the job. The identified technician's schedule is automatically updated with the new job and a message is sent to the technician's mobile telephone informing him of the change in schedule. The technician also receives directions to the new customer site on his mobile device. The technician arrives at the site, completes the job and sends a message back to the call center stating that the job has been completed. This entire scenario is enabled because the application can obtain context information from a central location which has aggregated and abstracted the context information for access by the application.

Of course, a wide variety of other applications can be written using the present context service. For instance, a mobile worker can subscribe to traffic updates on a cellular telephone, to receive those updates everyday from 5-6 PM when traffic is heavy. However, when the worker is out of town for the day, the application realizes this because it is contained in the context information provided by the context service (such as through the Schedule object). Therefore, the application detects that the worker is not in a local area and hence the traffic report is not sent.

Similarly, assume that a worker has identified as a preferred mobile device a personal digital assistant. Assume also that another person attempts to send the worker a message that is quite large, but not very urgent. The context-aware application detects this (again by retrieving context information from the present context service). The message is thus sent to the worker's desk-top computer so that the worker will receive it when he or she returns to the office at the end of the day. This can of course be accomplished by having the worker set up a preference as to which device should receive messages, based on message size.

These are but a few exemplary scenarios that can be addressed by context aware applications using the context service of the present invention. Of course, these are illustrative scenarios only, provided to illustrate some uses and operations of the present invention, and countless others can be supported by the present invention.

Although the present invention has been described with reference to particular embodiments, workers skilled in the art will recognize that changes may be made in form and detail without departing from the spirit and scope of the invention.

What is claimed is:

1. A context service system, comprising:
   a data aggregator component receiving context data from a plurality of different types of external data sources, comprising a plurality of files, a plurality of applications, a plurality of mobile devices, and one or more cellular networks, that provide context data in different formats and including a first type of external data source that provides user specific context information indicative of a user's identity, and schedule, and a second type of external data source that provides device context data indicative of a type of external computing device used by the user, and a type of application used by the computing device used by the user, the data aggregator component arranging the context data in a generalized format;
   a data store receiving the context data in the generalized format from the aggregator component and storing the context data; and
   a computer processor, being a functional component of the system and activated by the data aggregator component to facilitate implementation of the data provider component;
   wherein the data aggregator component comprises:
   a programming interface having exposed methods invoked to receive the context data and store the context data in the data store; and
   a data provider component receiving a data add request from one or more of the external data sources, the data add request including corresponding device context data, the data provider component invoking a method from among the exposed methods on the programming interface based on the data add request, selecting one or more external devices indicated by the device context data that corresponds to the data add request, and customizing the selected external devices with the context data in the generalized format to register the one or more selected external devices to the user and configure the one or more external devices for the user;
   wherein the data add request identifies context data to be stored and wherein the data provider component receives the context data to be stored and generates a context object representing the context data to be stored in the generalized format;
   wherein the data provider component invokes the method on the programming interface to provide the context object to the programming interface; and
   wherein the data aggregator component is a first data aggregator component in the system and the system further comprises a second data aggregator component, a local cache, and a local find service, wherein the second data aggregator component is in communicative connection with the first data aggregator component, wherein the local find service is configured to receive a data add request from one or more of the external data sources, to invoke a method from among the exposed methods on a second programming interface comprised in the second data aggregator component based on the data add request, wherein the second data aggregator component first seeks the context information based on the data add request on the local cache, and if the context information is not found on the local cache, then the second data aggregator component seeks the context information based on the data add request from the first data aggregator component, and customizes the selected external devices with the context data in the generalized format.

2. The context service system of claim 1 wherein the data sources invoke the exposed methods.

3. The context service system of claim 1 wherein the programming interface is configured to pass the context data to be stored, represented by the context object, to the data store.

4. The context service system of claim 1, wherein the external data sources from which the data aggregator component is configured to receive context data, comprise an external device.

5. The context service system of claim 1, wherein the external data sources from which the data aggregator component is configured to receive context data, comprise a mobile telephone.

6. The context service system of claim 1, wherein the external data sources from which the data aggregator component is configured to receive context data, comprise a mobile computing device.

7. The context service system of claim 1, wherein the external data sources from which the data aggregator component is configured to receive context data, comprise a geographic location device.

8. The context service system of claim 7, wherein the geographic location device comprises a Global Positioning System device.

9. The context service system of claim 1, wherein the external data sources from which the data aggregator component is configured to receive context data, comprises device registration information.

10. The context service system of claim 1, wherein the external data sources from which the data aggregator component is configured to receive context data, comprises user personnel files.

11. The context service system of claim 10, wherein the personnel files the data aggregator component is configured to receive from the external data sources, comprises one or more of a user's name, a user's identification, a user's address, a user's company, a user's title, a user's schedule, a user's contact list, a user's billing rate, a user's level of training, a user's expertise, a team to which a user belongs, a user's telephone number, a user's e-mail address, a user's pager number, a user's desired hours of availability, a user's devices, a user's preferences for which of several devices to use at different times, applications installed on a user's device, an operating system installed on a user's device, and memory available on a user's device.

12. The context service system of claim 1, wherein the context data the data aggregator component is configured to receive from the external data sources, comprises schedule information from a user's scheduling application.

13. The context service system of claim 1, wherein the context data the data aggregator component is configured to receive from the external data sources, comprises metadata for an application running on a mobile computing device.

14. The context service system of claim 1, wherein the context data the data aggregator component is configured to receive from the external data sources, comprises information on a geographic location of a mobile computing device.

15. The context service system of claim 1, wherein the context data the data aggregator component is configured to receive from the external data sources, comprises information on a geographic location of a mobile telephone.

16. The context service system of claim 1, wherein the context data the data aggregator component is configured to receive from the external data sources, comprises information on a mobile telephone service provider associated with a user's mobile telephone.

17. The context service system of claim 1, further comprising a security layer that enforces security measures on access to the context data.

18. The context service system of claim 1, wherein the system is further configured so that if the second data aggregator component seeks the context information based on the data add request from the first data aggregator component, then the second data aggregator component customizes the selected external devices with the context data in the generalized format from the first data aggregator component and invokes a method on the second interface to add the context information to the local cache.

19. A method of providing context data to a requesting application, comprising:

aggregating, with a computer processor, context data using a first data aggregator component from a plurality of different remote data sources, comprising a plurality of files, a plurality of applications, a plurality of mobile devices, and one or more cellular networks, that provide context data in different formats from one another over a network connection, the context data defining a physical location of a user and user qualification information indicative of the user's training, and device information indicative of an application running on a mobile device assigned to the user, wherein a second data aggregator component is in communicative connection with the first data aggregator component and includes an associated local cache and local find server;

abstracting the aggregated data into a generalized format;

receiving a context data request from the requesting application, the context data request itself including context data;

selecting, with the processor, one or more external devices indicated by the context data that corresponds to the context data request;

providing the one or more selected external devices with access to the abstracted aggregated data;

customizing the one or more selected external devices with the abstracted aggregated data;

receiving a data add request at the local find service from one or more of the external devices;

invoking a method from among exposed methods on a programming interface comprised in the second data aggregator component based on the data add request; and seeking context information based on the data add request on the local cache, and if the context information is not found on the local cache, then the second data aggregator component seeks the context information based on the data add request from the first data aggregator component, and customizes the selected external devices with the context data in the generalized format.

20. The method of claim 19 wherein aggregating comprises:

providing a programming interface with exposed methods invoked to submit the context data from the data sources.

21. The method of claim 20 wherein abstracting comprises:

converting the submitted context data to the generalized format; and storing the context data in a data store.

22. The method of claim 19 wherein providing the requesting application with access comprises:

providing a programming interface with exposed methods invoked to retrieve the context data and provide the context data in the generalized format to the requesting application.

23. The method of claim 19, wherein the requesting application requests the data over a network connection from a remote location, and wherein the method further comprises providing the access to the abstracted aggregated data to the requesting application over the network connection.

* * * * *